US012752690B2

(12) United States Patent
Nakamura

(10) Patent No.: US 12,752,690 B2
(45) Date of Patent: Oct. 6, 2026

(54) WORK VEHICLE

(71) Applicant: KUBOTA CORPORATION, Osaka (JP)

(72) Inventor: Taro Nakamura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 182 days.

(21) Appl. No.: 18/931,040

(22) Filed: Oct. 30, 2024

(65) Prior Publication Data

US 2025/0206217 A1 Jun. 26, 2025

(30) Foreign Application Priority Data

Dec. 21, 2023 (JP) ................................ 2023-215966

(51) Int. Cl.
*B60N 3/04* (2006.01)
*E02F 9/16* (2006.01)

(52) U.S. Cl.
CPC ................ *B60N 3/048* (2013.01); *E02F 9/16* (2013.01)

(58) Field of Classification Search
CPC .................................. B60N 3/04; B60N 3/048
See application file for complete search history.

(56) References Cited

U.S. PATENT DOCUMENTS

| | | | | |
|---|---|---|---|---|
| 2,505,554 A * | 4/1950 | Kravitz | B60N 3/04 428/167 |
| 2004/0187409 A1 * | 9/2004 | Kojima | E02F 9/16 52/220.1 |
| 2020/0070904 A1 | 3/2020 | Yasunobe | |
| 2020/0072344 A1 | 3/2020 | Yasunobe | |
| 2023/0250612 A1 | 8/2023 | Takaki et al. | |
| 2023/0374752 A1 | 11/2023 | Takaki et al. | |

FOREIGN PATENT DOCUMENTS

| | | | |
|---|---|---|---|
| JP | H0710040 A * | 1/1995 |
| JP | 2000-17690 A * | 1/2000 |
| JP | 4576595 B2 | 4/2002 |
| JP | 2004-122901 A * | 4/2004 |
| JP | 2005-146555 | 6/2005 |
| JP | 2020-037359 | 3/2020 |
| JP | 2020-038457 | 3/2020 |
| JP | 2023-115702 | 8/2023 |
| JP | 2023-172233 | 12/2023 |
| WO | WO 2014002298 * | 1/2014 |

* cited by examiner

*Primary Examiner* — Joseph D. Pape
(74) *Attorney, Agent, or Firm* — MORI & WARD, LLP

(57) ABSTRACT

A work vehicle includes a cabin frame defining a cabin interior, and a floor mat placed on the cabin frame. The cabin frame includes a floor frame, a front frame, and a seat support frame. The floor frame includes a bottom frame having a flat shape that defines a bottom floor surface facing the cabin interior. The floor mat includes a slant mat portion having a second mat surface facing the cabin interior, and a bottom mat portion having a first mat surface facing the cabin interior. A first angle formed by the first mat surface and the second mat surface is larger than a second angle formed by the bottom floor surface and a plane defined to include a first straight line representing a boundary between the bottom frame and a slant frame and a second straight line representing a boundary between the slant frame and the front frame.

20 Claims, 12 Drawing Sheets

WORK VEHICLE

CROSS-REFERENCE TO RELATED APPLICATIONS

The present application claims priority under 35 U.S.C. § 119 to Japanese Patent Application No. 2023-215966, filed Dec. 21, 2023. The contents of this application are incorporated herein by reference in their entirety.

BACKGROUND

Technical Field

The present invention relates to a work vehicle.

Discussion of the Background

Japanese Patent No. 4576595 discloses a work vehicle having a footrest that inclines downward from the front to the rear of the cabin. U.S. Patent Application Publication No. 2023/0374752 discloses a work vehicle having a cabin that can be opened and closed.

SUMMARY

In accordance with a first aspect of the present disclosure, a work vehicle includes a cabin frame defining a cabin interior, and a floor mat placed on the cabin frame. The cabin frame includes a floor frame configured to support the floor mat, a front frame configured to support a front window; and a seat support frame configured to support a driver's seat opposite to the front frame with respect to the floor frame. The floor frame includes a bottom frame connected to the seat support frame and has a flat shape that defines a bottom floor surface facing the cabin interior, and a slant frame connecting the front frame and the bottom frame. The slant frame is inclined closer to the front frame than the bottom frame. The slant frame is provided between a first straight line and a second straight line. The first straight line represents a boundary facing the cabin interior between the bottom frame and the slant frame, and the second straight line represents a boundary facing the cabin interior between the slant frame and the front frame. The floor mat includes a bottom mat portion provided on the bottom frame, the bottom mat portion having a first mat surface facing the cabin interior, and a slant mat portion provided to be supported by both the slant frame and the bottom frame and connected to the bottom mat portion such that the bottom mat portion is provided between the seat support frame and the slant mat portion. The slant mat portion has a second mat surface facing the cabin interior. A first angle formed by the first mat surface and the second mat surface is larger than a second angle formed by the bottom floor surface and a plane defined to include the first straight line and the second straight line.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
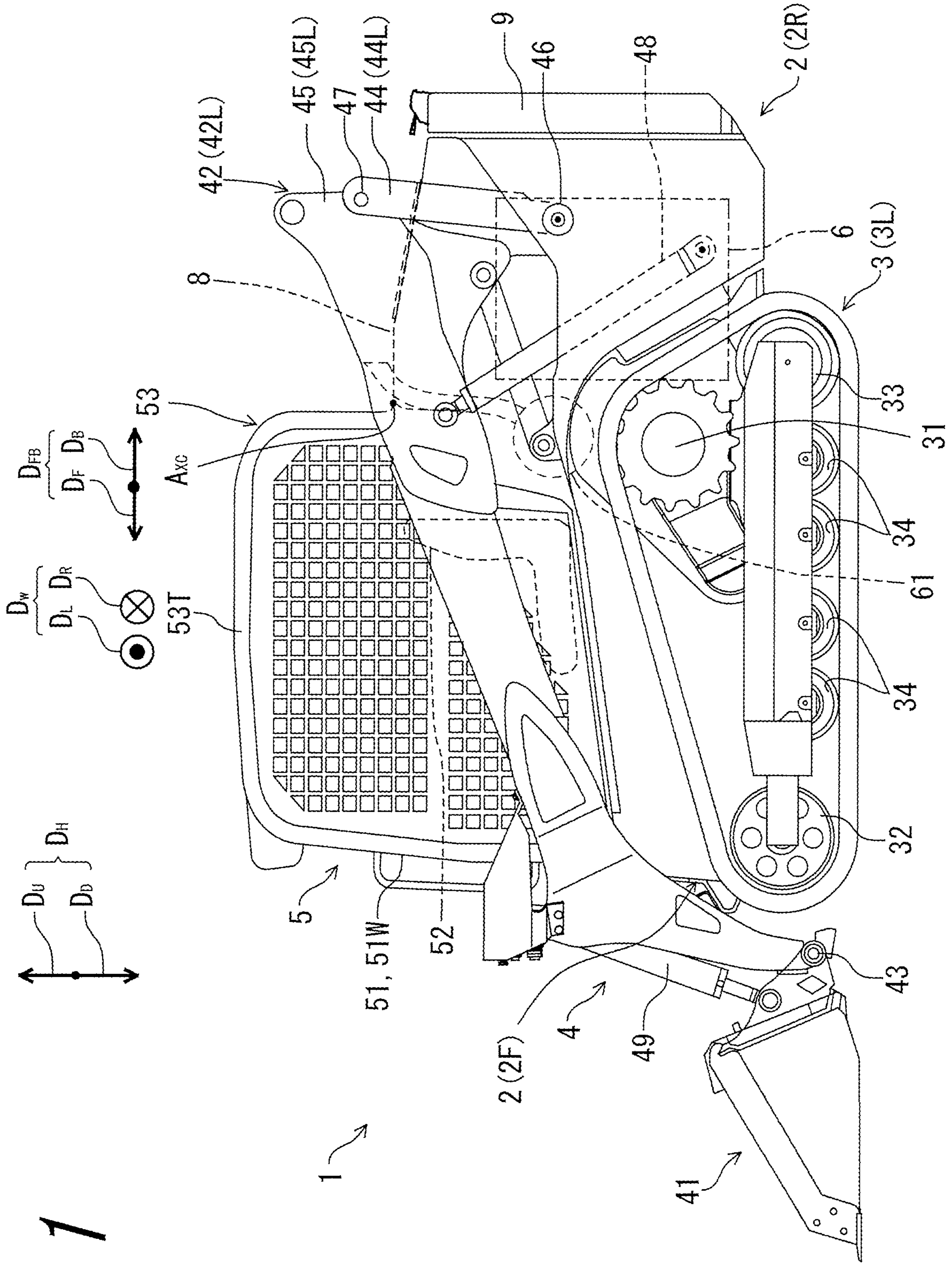
FIG. 1 is a side view of a work vehicle.

The present invention will be described in detail below with reference to the drawings showing embodiments thereof. In the drawings, the same reference numerals denote corresponding or substantially the same components.

Exemplary Embodiment

<Overall Configuration>

Referring to FIG. 1, a work vehicle 1 includes a vehicle body frame 2, a traveling device 3, a work device 4, and a cabin 5. The vehicle body frame 2 supports the pair of traveling devices 3, the work device 4, and the cabin 5. The pair of traveling devices 3 are rotatably supported by the vehicle body frame 2 and configured to drive the vehicle body frame 2 forward and rearward. In the illustrated embodiment, the pair of traveling devices 3 are crawler type traveling devices 3. Therefore, each of the pair of traveling devices 3 includes a driving wheel 31, driven wheels 32 and 33, and a rolling wheel 34, respectively. However, the pair of traveling devices 3 is not limited to the crawler type traveling device 3. The vehicle body frame 2 has a vehicle body front portion 2F and a vehicle body rear part 2R opposite to the vehicle body front portion 2F. The traveling device 3 may be, for example, a front wheel/rear wheel traveling device, or a traveling device having a front wheel and a rear crawler. The work device 4 comprises work equipment (bucket) 41 at the distal end of the work device 4. A proximal end of the work device 4 is attached to the vehicle body rear part 2R of the vehicle body frame 2. The work device 4 includes a pair of arm assemblies 42 for rotatably supporting the bucket 41 via the bucket pivot shaft 43. Each of the pair of arm assemblies 42 is coupled to a lift link 44 and an arm 45.

The lift link 44 includes is rotatable relative to the vehicle body frame 2 about a longitudinal the fulcrum shaft 46. The arm 45 is rotatable about a joint shaft 47 with respective to the lift link 44. The work device 4 further includes a plurality of arm cylinders 48 and at least one equipment cylinder 49. Each of the plurality of arm cylinders 48 is rotatably connected to the vehicle body frame 2 and the arm 45, and moves the lift link 44 and the arm 45 to raise and lower the bucket 41. At least one implement cylinder 49 is configured to tilt the bucket 41.

Figure 2:
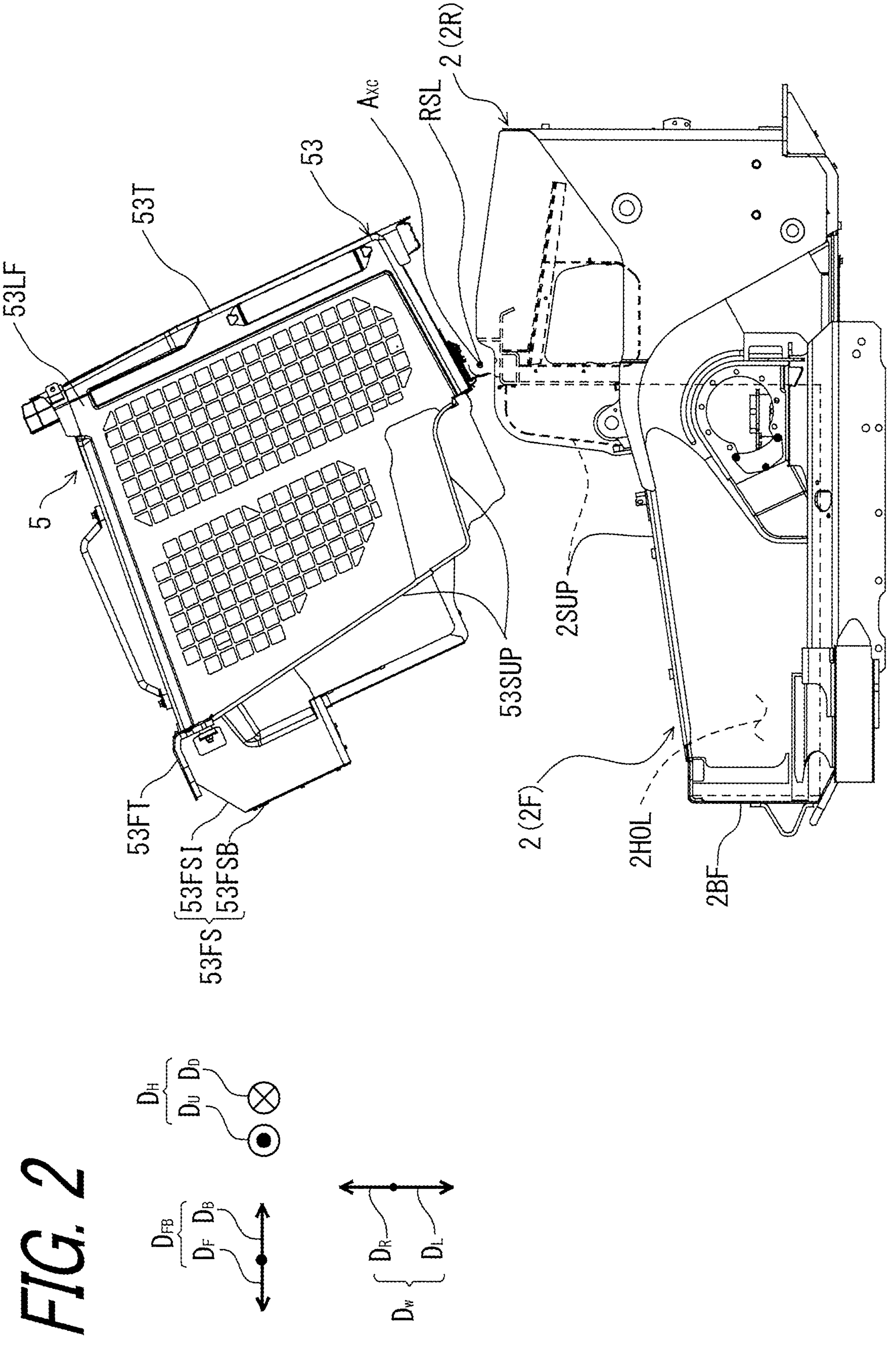
FIG. 2 is a side view of the work vehicle when a cabin is rotated.
Figure 3:
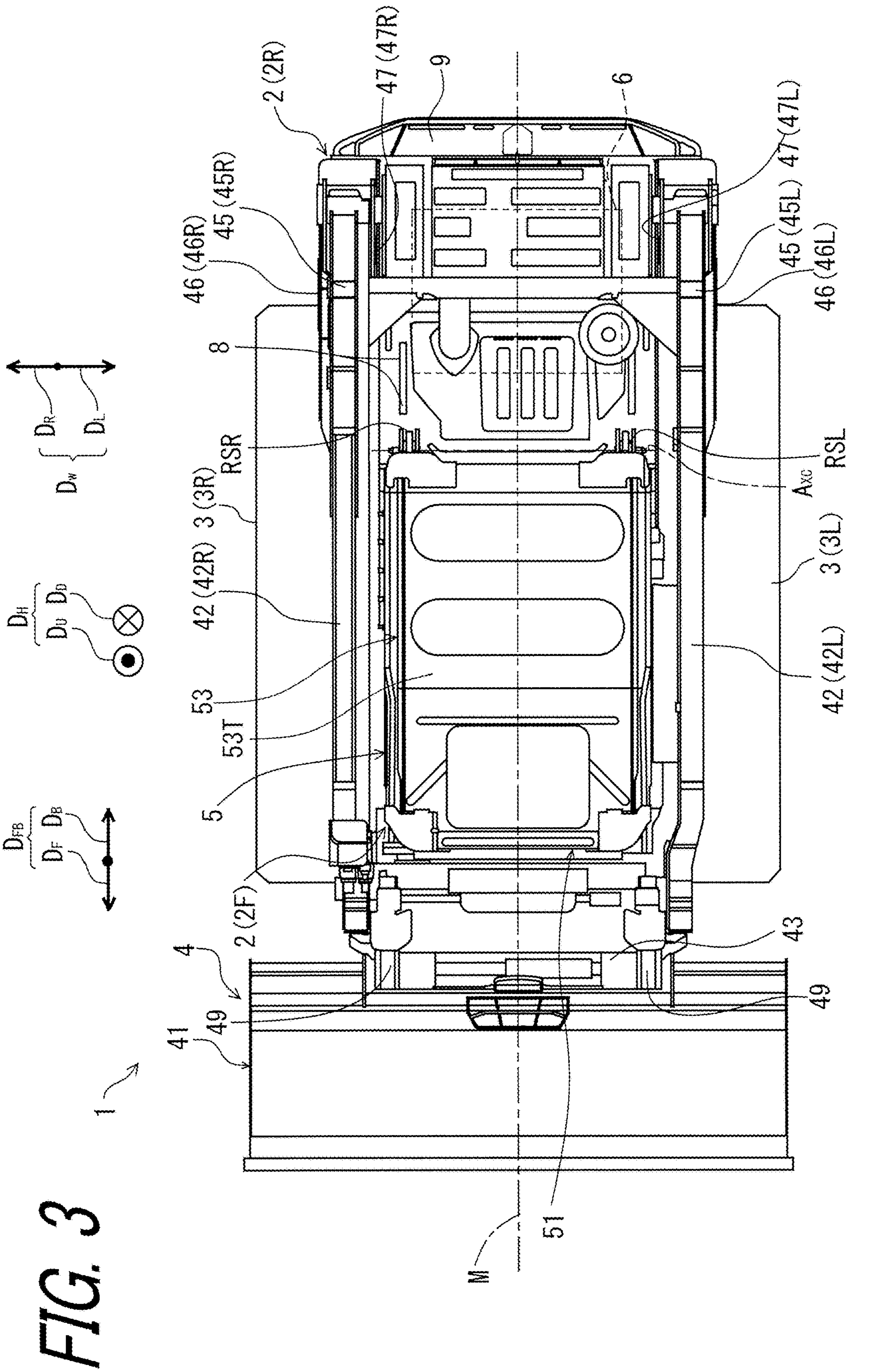
FIG. 3 is a top view of the work vehicle.

Referring to FIG. 2, the cabin 5 is attached to the front portion of the vehicle body of the vehicle body frame 2. In FIGS. 1 to 3, a common rotational axis AXC defined by the rotational shafts RSL and RSR is illustrated. Referring to FIGS. 1 and 2, the cabin 5 can be switched between a closed state (see FIG. 1) in which the cabin 5 is placed on the vehicle body front portion 2F and an open state (see FIG. 2) in which the cabin 5 is separated from the vehicle body front portion 2F by pivoting around the rotational shafts RSL and RSR. In the closed state, for example, the supported portion 53SUP of the cabin 5 abuts against the supporting portion 2SUP of the vehicle body front portion 2F, and the cabin 5 is supported by the vehicle body front portion 2F. The vehicle body frame 2 (vehicle body front portion 2F) has a storage hole 2HOL for storing a floor frame 53FS (details will be described later) of the cabin 5 in the closed state.

In the embodiment according to the present application, a front-back direction DFB (forward direction DF/backward direction DB) means a front-back direction (forward direction/backward direction) as seen from an operator seated on the driver's seat 52 of the cabin 5. A leftward direction DL, a rightward direction DR, a width direction DW means the left direction, the right direction, and the left-right direction as viewed from the driver, respectively. An upward direction DU, a downward direction DD, height direction DH means an upward direction, a downward direction, and a height direction as viewed from the driver. Specifically, the downward direction DD is a direction from the vehicle body frame 2 toward the ground, which is perpendicular to the forward direction DF, the rearward direction DB, and the width direction DW. The upward direction DU is a direction opposite to the downward direction DD in the height direction DH. The front-back, left-right (width), and up-down (height) directions of the work vehicle 1 coincide with the front-back, left-right (width), and up-down (height) directions as viewed from the driver, respectively.

Figure 4:
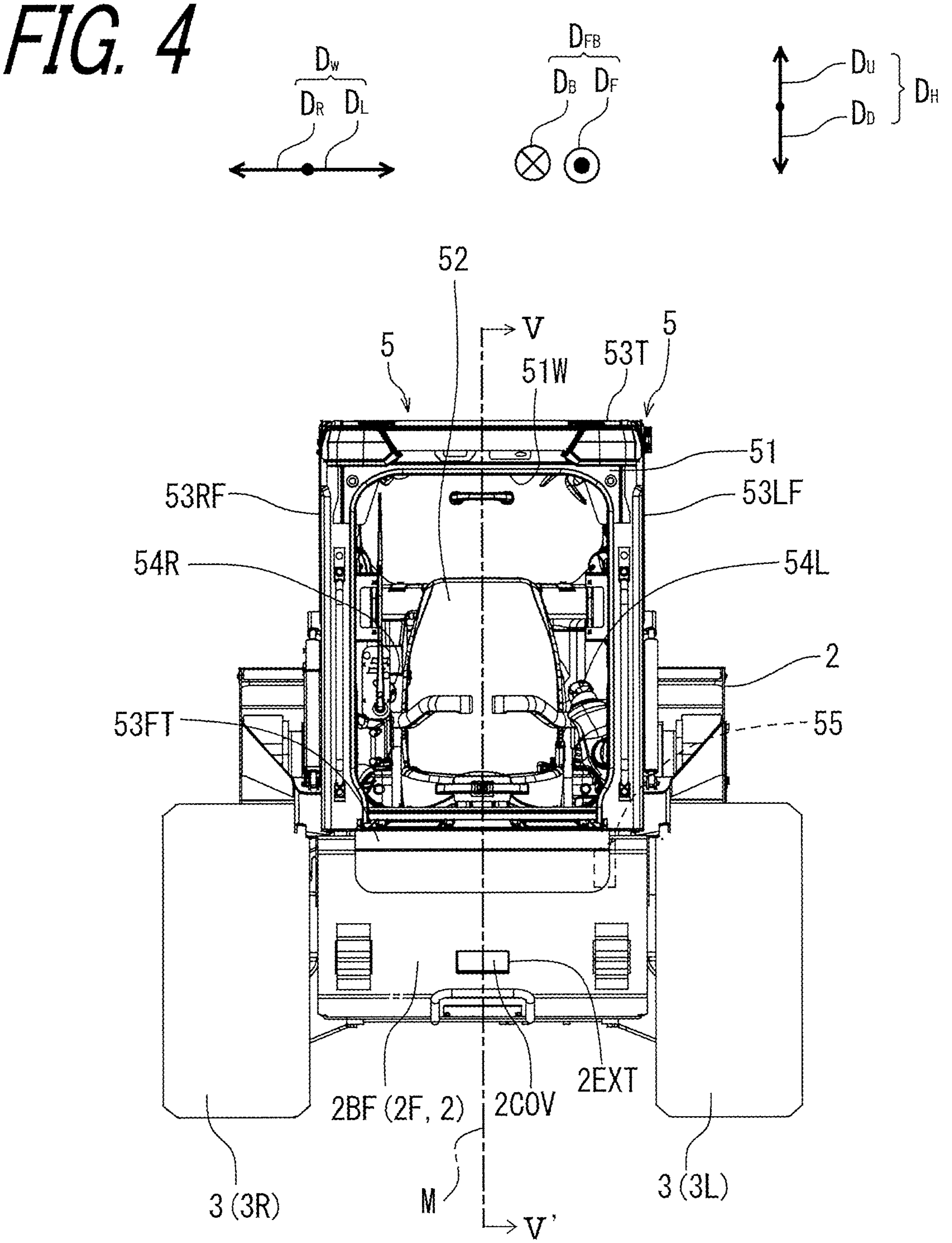
FIG. 4 is a front view of a vehicle body frame and the cabin.

FIG. 4 is a front view of the vehicle body frame 2 and the cabin 5. In FIG. 4, the work device 4 is omitted. Referring to FIG. 4, the work vehicle 1 includes a front door 51 in front of the cabin 5. The front door 51 includes a front window 51W. In FIG. 4, the internal space of the cabin 5 which is visible through the front window 51W is indicated by a solid line. The work vehicle 1 includes a driver's seat 52 and an operation device 54L or 54R in the cabin 5. The interior space of the cabin 5 is defined by the cabin frame 53. That is, the cabin frame 53 defines the cabin 5. The cabin frame 53 includes a top frame 53T that covers an upper portion of the interior space of the cabin 5, a first side frame 53LF that covers one of the left side and the right side of the interior space of the cabin 5, and a second side frame 53RF that covers the other of the left side and the right side of the interior space of the cabin 5. As shown in FIG. 2 and FIG. 3, the cabin frame 53 is connected to the vehicle body frame 2 to be rotatable about rotational shafts RSL and RSR provided on the vehicle body frame 2. That is, the vehicle body frame 2 supports the cabin frame 53 so as to be turnable around the rotational axis AXC. In FIG. 2, the illustration of the vehicle body frame 2 and the cabin 5 is omitted for the sake of clarity.

In FIG. 3, one of the pair of traveling devices 3 is provided on the left side of the cabin 5. The other of the pair of traveling devices 3 is provided on the right side of the cabin 5. The pair of traveling devices 3 are opposed to each other in the width direction DW. One of the pair of arm assemblies 42 is provided on the left side of the cabin 5. The other of the pair of arm assemblies 42 is provided on the right side of the cabin 5. More specifically, one of the arm cylinders 48 and one of the arms 45 are provided on the left side of the cabin 5. The other arm cylinder 48 and the other arm 45 are provided on the right side of the cabin 5. FIG. 1 shows the left side of the work vehicle 1. As shown in FIGS. 3 and 4, the vehicle body frame 2 is substantially plane-symmetrical with respect to the vehicle body center plane M, and among the pair of traveling devices 3, the traveling device 3 provided on the left side with respect to the vehicle body center plane M is shown as a first traveling device 3L, and the traveling device 3 provided on the right side with respect to the vehicle body center plane M is shown as a second traveling device 3R.

Among the pair of arm assemblies 42, the arm assembly 42 provided on the left side with respect to the vehicle body center plane M is shown as the first arm assembly 42L, and the arm assembly 42 provided on the right side with respect to the vehicle body center plane M is shown as the second arm assembly 42R. The lift link 44 provided on the left side with respect to the vehicle body center plane M is shown as a first lift link 44L, and the lift link 44 provided on the right side with respect to the vehicle body center plane M is shown as a second lift link 44R. An arm 45 provided on the left side of the vehicle body center plane M is shown as a first arm 45L, and an arm 45 provided on the right side of the vehicle body center plane M is shown as a second arm 45R. The fulcrum shaft 46 provided on the left side of the vehicle body center plane M is shown as the first fulcrum shaft 46L. The fulcrum shaft 46 provided on the right side with respect to the vehicle body center plane M is shown as a second fulcrum shaft 46R. The joint shaft 47 provided on the left side with respect to the vehicle body center plane M is shown as a first joint shaft 47L, and the joint shaft 47 provided on the right side with respect to the vehicle body center plane M is shown as a second joint shaft 47R.

Referring to FIGS. 1 and 3, the work vehicle 1 further includes an engine 6 provided at a rear portion of the vehicle body frame 2. The engine 6 is configured to provide driving force to the traveling device 3 and the work device 4. The engine 6 is provided between the pair of arm assemblies 42 in the width direction DW of the work vehicle 1. The work vehicle 1 further includes a bonnet cover 8 for covering the engine 6. The work vehicle 1 further includes a rear bonnet cover 9 provided at the rear end of the vehicle body frame 2. The rear bonnet cover 9 is openable and closable such that a maintenance worker can perform maintenance work on the engine 6 and the like.

Figure 5:
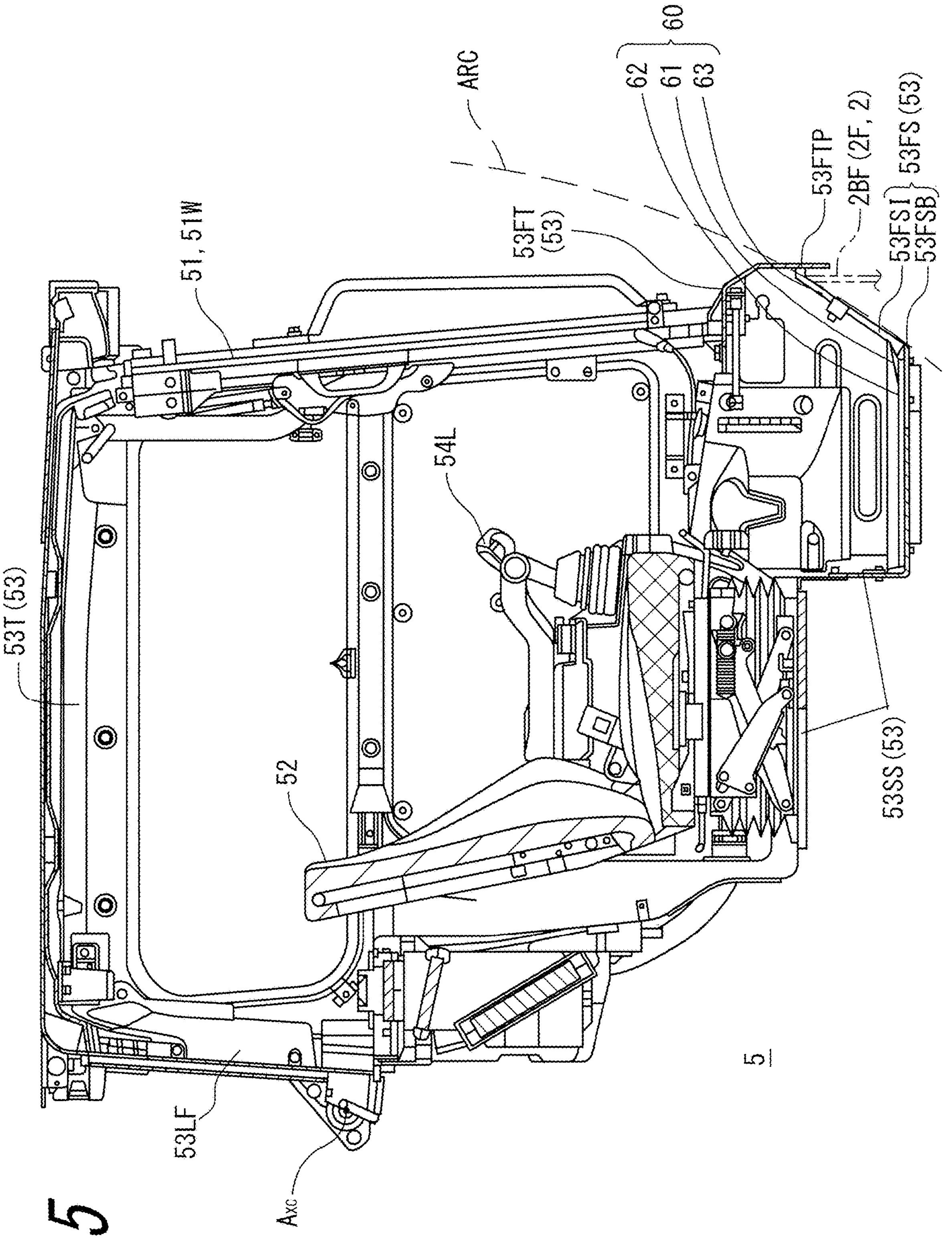
FIG. 5 is a sectional view of the cabin taken along the line V-V' in FIG. 4.

FIG. 5 is a sectional view of the cabin 5 taken along the section line V-V' in FIG. 4. Referring to FIG. 5, the work vehicle 1 includes a floor mat 60 placed on the cabin frame 53. The cabin frame 53 further includes a front frame 53FT, a floor frame 53FS, and a seat support frame 53SS. The first side frame 53LF connects the front frame 53FT, the floor frame 53FS and the seat support frame 53SS. Although not shown in FIG. 5, the cabin frame 53 is substantially symmetrical with respect to the vehicle body center plane M (see FIG. 3), and the second side frame 53RF connects the front frame 53FT, the floor frame 53FS, and the seat support frame 53SS. The front frame 53FT supports the front window 51W. The front frame 53FT includes an extension 53FTP that extends forward from the vehicle body frame 2 when the cabin frame 53 is mounted on the vehicle body frame 2. The floor frame 53FS supports a floor mat 60. The seat support frame 53SS supports the driver's seat 52 opposite to the floor frame 53FS with respect to the front frame 53FT. The floor frame 53FS includes a bottom frame 53FSB and a slant frame FSI. The bottom frame 53FSB is connected to the seat support frame 53SS. The bottom frame 53FSB has a flat plate shape. The slant frame FSI connects the front frame 53FT and the bottom frame 53FSB. To be specific, the slant frame FSI is connected to the extension 53FTP. Referring to FIGS. 4 and 5, the vehicle body frame 2 includes a front base frame 2BF that covers the front side of the slant frame FSI when the cabin frame 53 is placed on the vehicle body frame 2.

Figure 6:
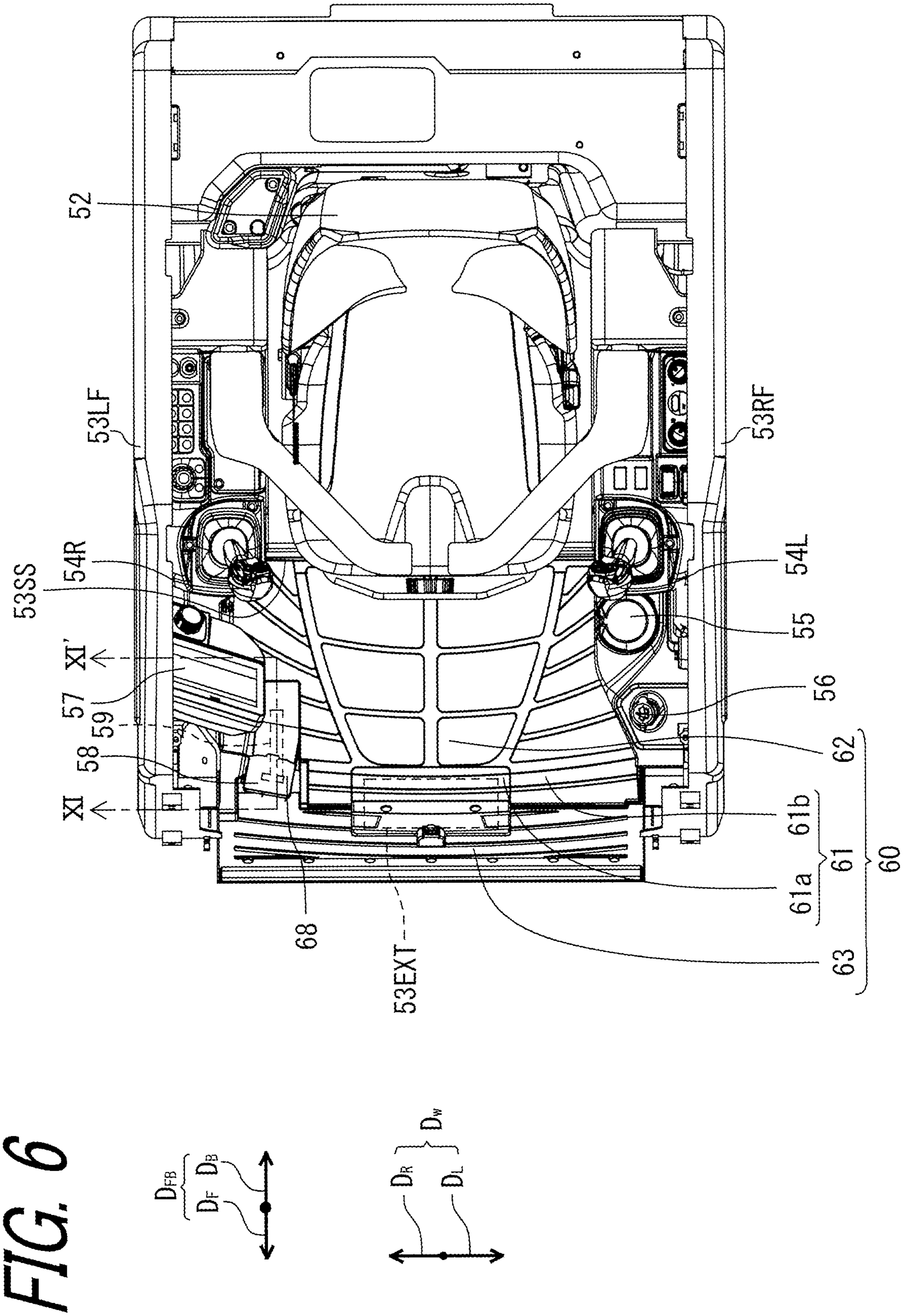
FIG. 6 is a top view of the cabin with a top frame of the cabin removed.

FIG. 6 is a top view of the cabin 5 of which the top frame 53T is removed. Referring to FIGS. 5 and 6, the work vehicle 1 includes a cup holder 55 and a washer button 56 in front of the operation device 54L. The work vehicle 1 includes a monitor 57 in front of the operation device 54R. Referring to FIG. 5, the cup holder 55 is located between the washer button 56 and the operation device 54L in the front-back direction DFB. The cup holder 55 and the washer button 56 are located on the downward direction DD of the driver's seat 52 and the operation device 54L. Referring to FIG. 4, the cup holder 55 is positioned at the downward direction DD so as not to be seen through the front window 51W while facing the rearward direction DB. The work vehicle 1 further includes brake pad 58 provided on the floor frame 53FS and brake arms 59 supporting the brake pad 58.

Figure 7:
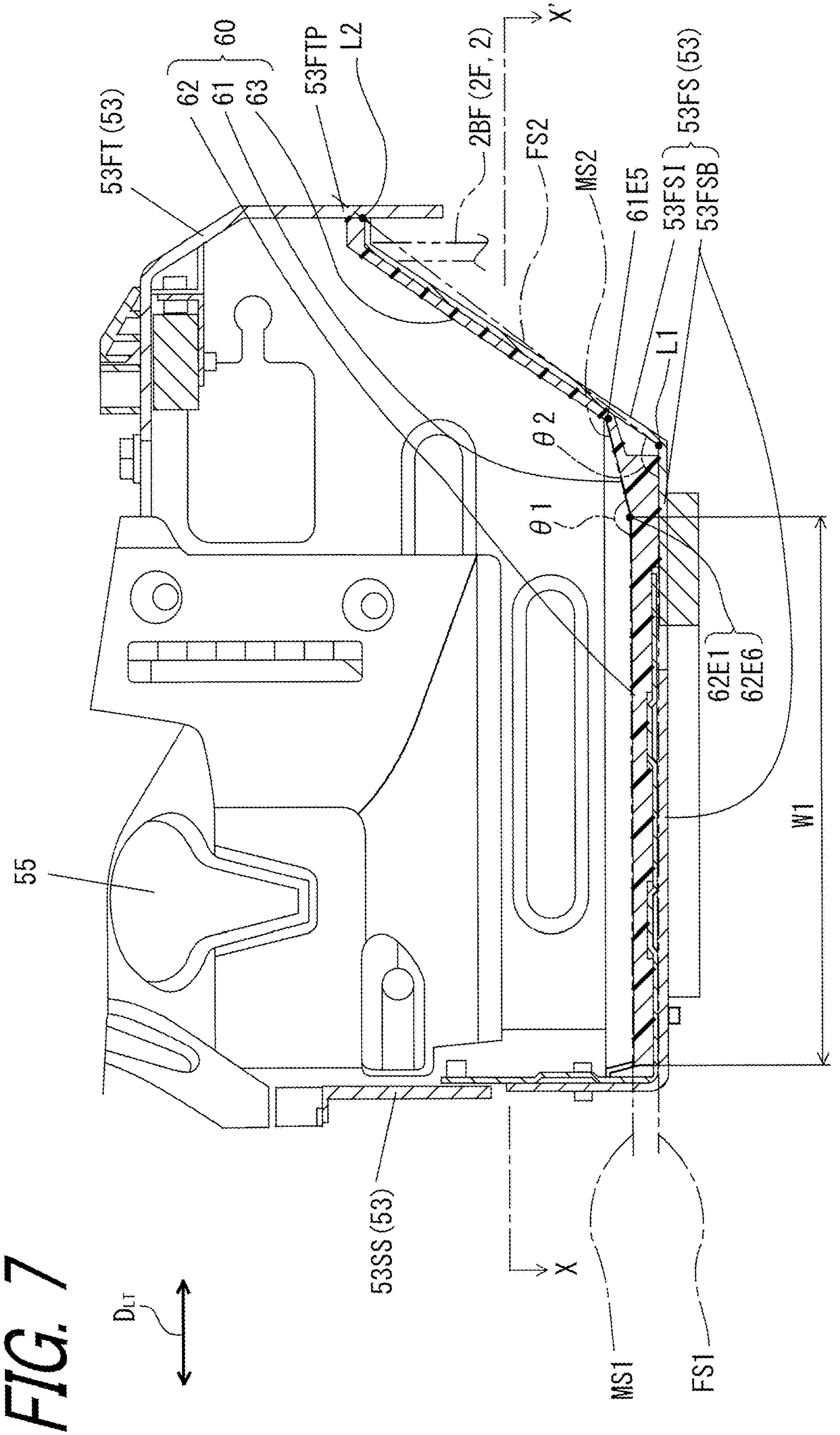
FIG. 7 is an enlarged sectional view of a floor mat and a cabin frame.

In FIG. 6, the front door 51 and the front frame 53FT are omitted to clarify the shape of the floor mat 60. FIG. 7 is an enlarged sectional view of the floor mat 60 and the cabin frame 53. Referring to FIGS. 6 and 7, the floor mat 60 includes a slant mat portion 61, a bottom mat portion 62, and a first additional mat portion 63. The slant mat portion 61 is provided so as to be supported by both the slant frame FSI and the bottom frame 53FSB. The bottom mat portion 62 is connected to the slant mat portion 61 and is provided on the bottom frame 53FSB between the slant mat portion 61 and the seat support frame 53SS. The first additional mat portion 63 is provided on the slant frame 53FSI opposite to the bottom mat portion 62 with respect to the slant mat portion 61. Referring to FIG. 7, the slant mat portion 61 and the bottom mat portion 62 are integrally formed. The first additional mat portion 63 is a separate body from the slant mat portion 61 and the bottom mat portion 62, but may be integrally formed.

Referring to FIG. 7, a first angle θ1 formed between a first mat surface MS1 facing the interior of the cabin 5 of the bottom mat portion 62 and a second mat surface MS2 facing the interior of the cabin 5 of the slant mat portion 61 is larger than a second angle θ2 formed between a plane surface FS2 defined as to include a straight line L1 representing a boundary facing the interior of the cabin 5 of the bottom frame 53FSB and the slant frame 53FSI and a bottom floor surface FS1 facing the interior of the cabin 5 of the bottom frame 53FSB. FIG. 5 shows a trajectory through which the outer end of the slant frame 53FSI farthest from the rotational axis AXC passes when the slant frame 53FSI rotates around the rotational axis AXC, by an arc ARC. The second angle θ2 is determined so that the slant frame 53FS1 does not come into contact with the front base frame 2BF when the slant frame 53FS1 rotates around the rotational axis.

Further, referring to FIG. 7, the first angle θ1 is greater than 150 degrees, and the second angle θ2 is less than 150 degrees. This allows the angle of the footrest to be smaller than 30 degrees. When the angle of the footrest is smaller than 30 degrees, the burden on the lower limbs is small, which is preferable. The length W1 of the bottom frame 53FSB in the longitudinal direction DLT in which the seat support frame 53SS and the slant frame 53FS1 face each other along the bottom floor surface FS1 is larger than 131 cm. This is sufficient for a large worker to land on the bottom mat portion 62 when he/she steps on the front frame 53FT and gets into the cabin 5, as defined by JIS A8315:2010 (ISO3411:2017).

Figure 8:
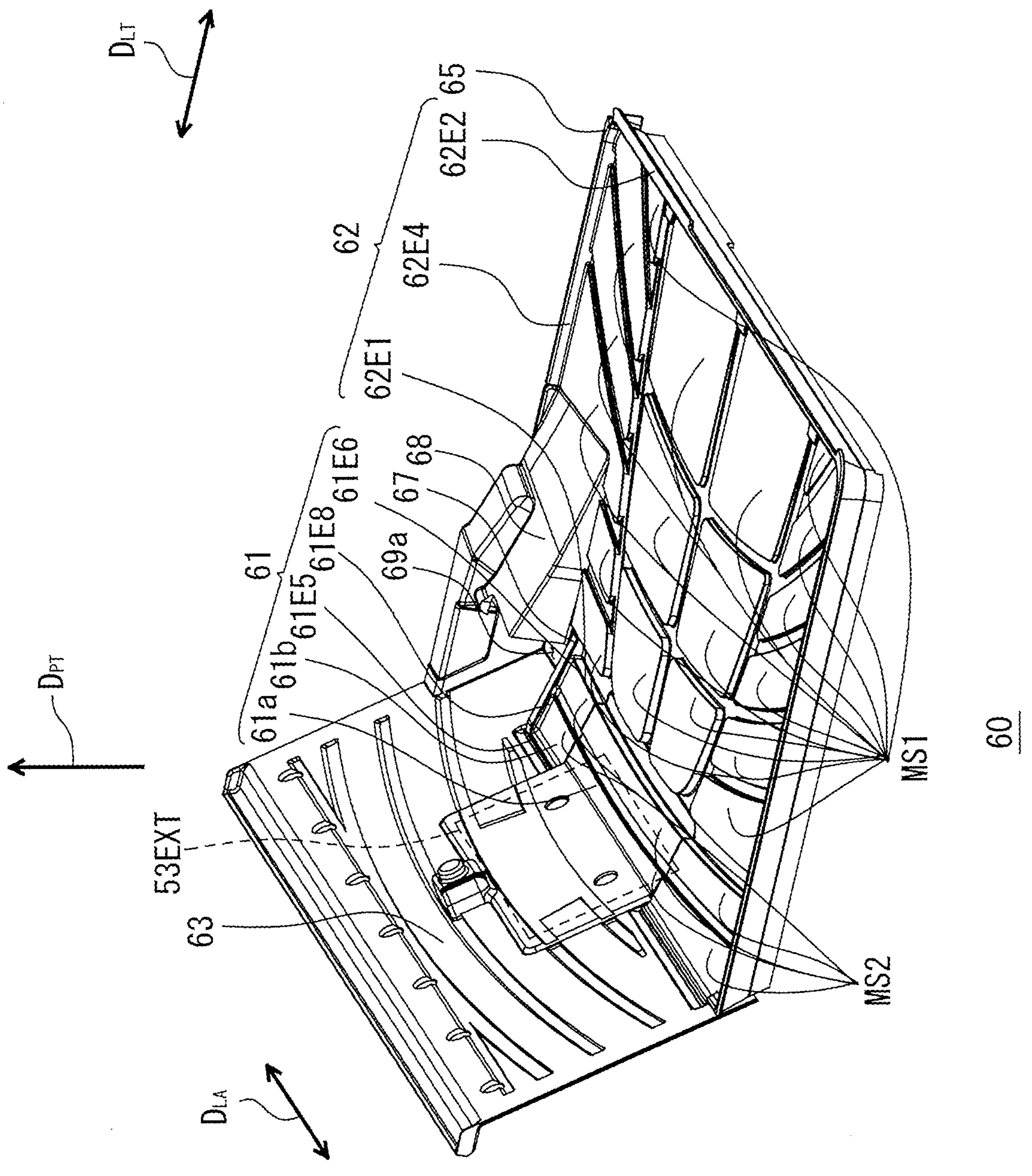
FIG. 8 is a perspective view of the floor mat.
Figure 9:
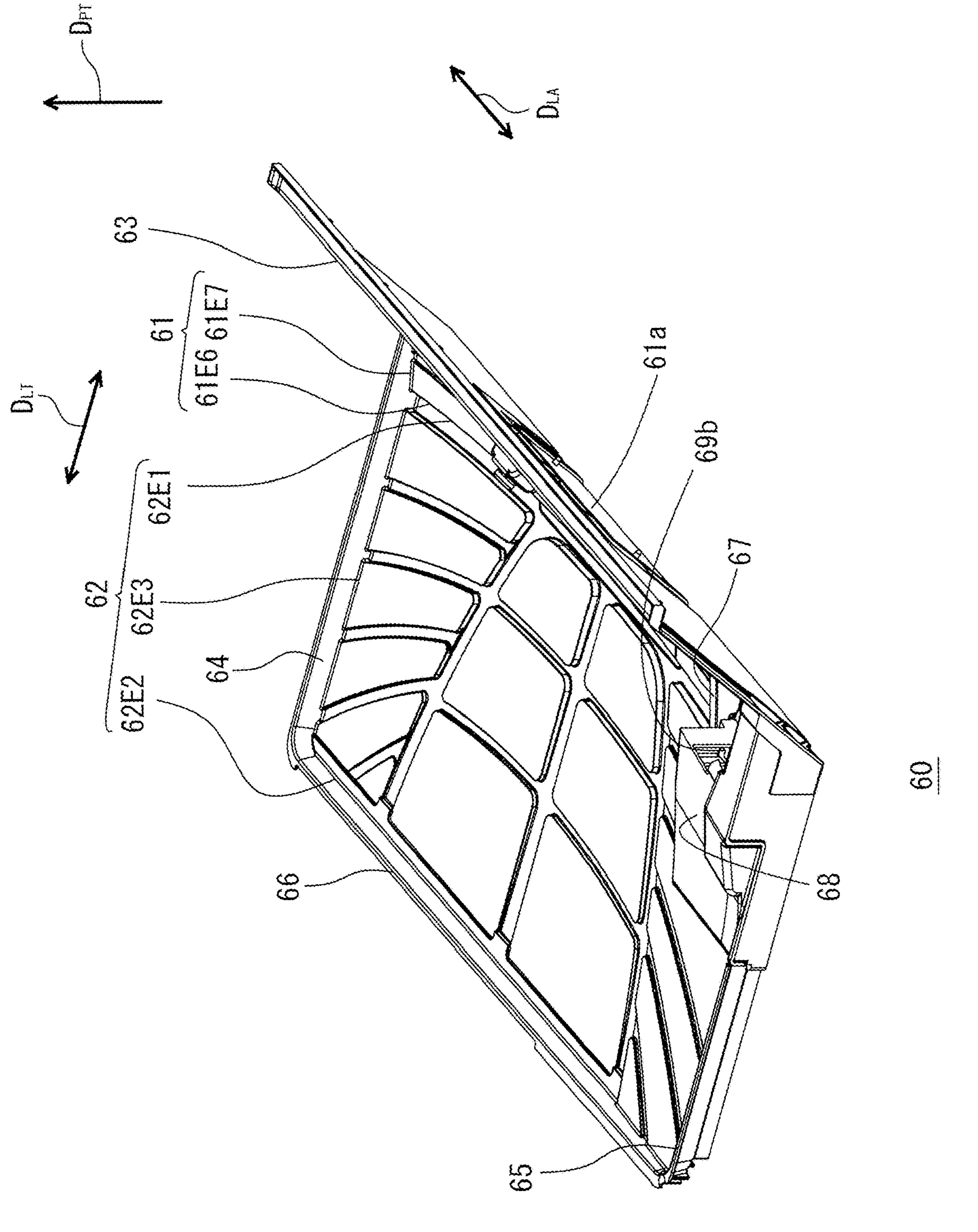
FIG. 9 is a perspective view of the floor mat as viewed from another direction.
Figure 10:
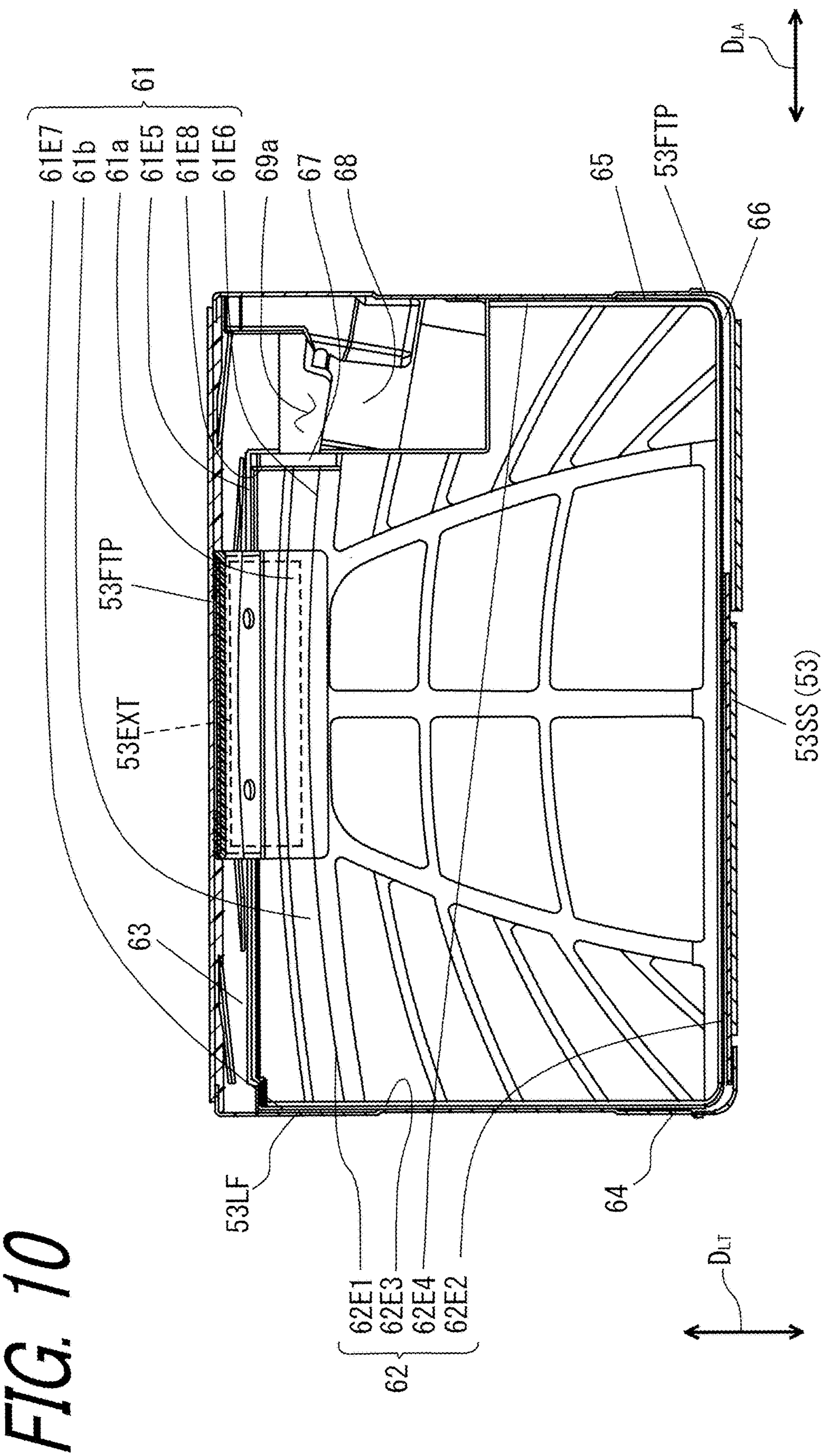
FIG. 10 is a sectional view of the cabin taken along the line X-X' of FIG. 7.

FIG. 8 is a perspective view of the floor mat 60. FIG. 9 is a perspective view of the floor mat 60 as viewed from another direction. FIG. 10 is a sectional view of the cabin 5 taken along the section line X-X' of FIG. 7. Referring to FIGS. 8 to 10, the bottom mat portion 62 includes a first end 62E1, a second end 62E2, a third end 62E3, and a fourth end 62E4. The first end 62E1 is in contact with the slant mat portion 61. The second end 62E2 faces the seat support frame 53SS opposite to the first end 62E1 in the longitudinal direction DLT. The third end 62E3 connects the first end 62E1 and the second end 62E2. The fourth end 62E4 connects the first end 62E1 and the second end 62E2 opposite to the third end 62E3 in the lateral direction DLA perpendicular to the longitudinal direction DLT. In the present embodiment, the lateral direction DLA is the same direction as the width direction DW.

The slant mat portion 61 includes a fifth end 61E5, a sixth end 61E6, a seventh end 61E7, and an eighth end 61E8. The fifth end 61E5 faces the slant frame 53FSI. The sixth end 61E6 faces the bottom frame 53FSB opposite to the fifth end 61E5 in the longitudinal direction DLT. The seventh end 61E7 connects the fifth end 61E5 and the sixth end 61E6. The eighth end 61E8 connects the fifth end 61E5 and the sixth end 61E6 on the side opposite to the seventh end 61E7 in the lateral direction DLA. Referring to FIG. 7, the fifth end 61E5 is in contact with the slant frame 53FSI via the first additional mat portion 63. The sixth end 61E6 is in direct contact with the bottom frame 53FSB. However, the fifth end 61E5 may be in direct contact with the slant frame 53FSI, and the sixth end 61E6 may be in indirect contact with the bottom frame 53FSB via another member.

The floor mat 60 further includes a first rib 64, a second rib 65, a third rib 66, a fourth rib 67, and a brake arm cover 68. The first rib 64 is connected to the third end 62E3 and the seventh end 61E7, and protrudes from the first mat surface MS1 and the second mat surface MS2 in a protruding direction DPT which is perpendicular to the longitudinal direction DLT and the lateral direction DLA and in which the second mat surface MS2 is inclined with respect to the first mat surface MS1. The second rib 65 is connected to the fourth end 62E4 and protrudes from the first mat surface MS1 in the protruding direction DPT. The third rib 66 is connected to the second end 62E2, the first rib 64, and the second rib 65, and protrudes from the first mat surface MS1 in the protruding direction DPT. Referring to FIG. 10, the first rib 64 is provided to abut against the first side frame 53LF. That is, the first side frame 53LF is provided to abut on the first rib 64. The second rib 65 is provided to abut on the second side frame 53RF opposite to the first side frame 53LF in the lateral direction DLA. That is, the second side frame 53RF is provided so as to abut on the second rib 65 opposite to the first side frame 53LF in the lateral direction DLA. The third rib 66 is provided to abut against the seat support frame 53SS. The first rib 64 to the third rib 66 facilitate positioning of the floor mat 60 on the floor frame 53FS, and prevent mud accumulated on the brake pad 58 from entering between the floor mat 60 and the floor frame 53FS.

Figure 11:
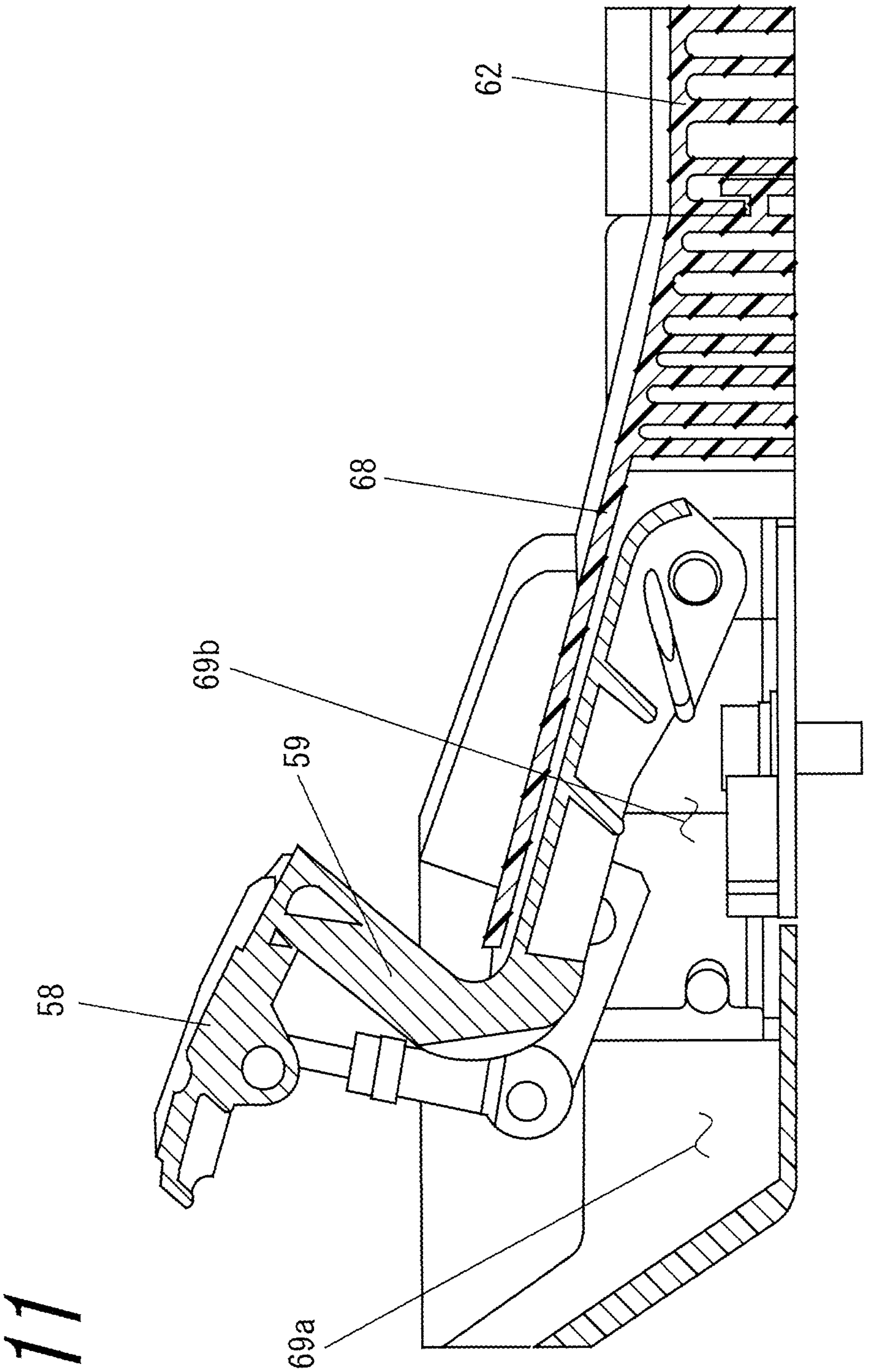
FIG. 11 is a cross-sectional view taken along the line XI-XI' of FIG. 6.

FIG. 11 is a cross-sectional view taken along the line XI-XI' of FIG. 6. Referring to FIGS. 6 and 11, the brake arm cover 68 is provided on the bottom mat portion 62, covers the brake arm 59, and protrudes from the bottom mat portion 62 in the protruding direction DPT. The slant mat portion 61 is cut away at a brake installation portion 69*a* that overlaps with the brake pad 58 in the direction opposite to the protruding direction DPT. The fourth rib 67 faces (is provided beside) the brake installation portion 69*a*, is connected to the eighth end 61E8, and protrudes from the second mat surface MS2 in the protruding direction DPT. The bottom mat portion 62 is cut away at a portion overlapping the brake arm cover 68 in the opposite direction. The slant mat portion 61, the bottom mat portion 62, the first rib 64, the second rib 65, the third rib 66, and the fourth rib 67 are integrally formed.

Figure 12:
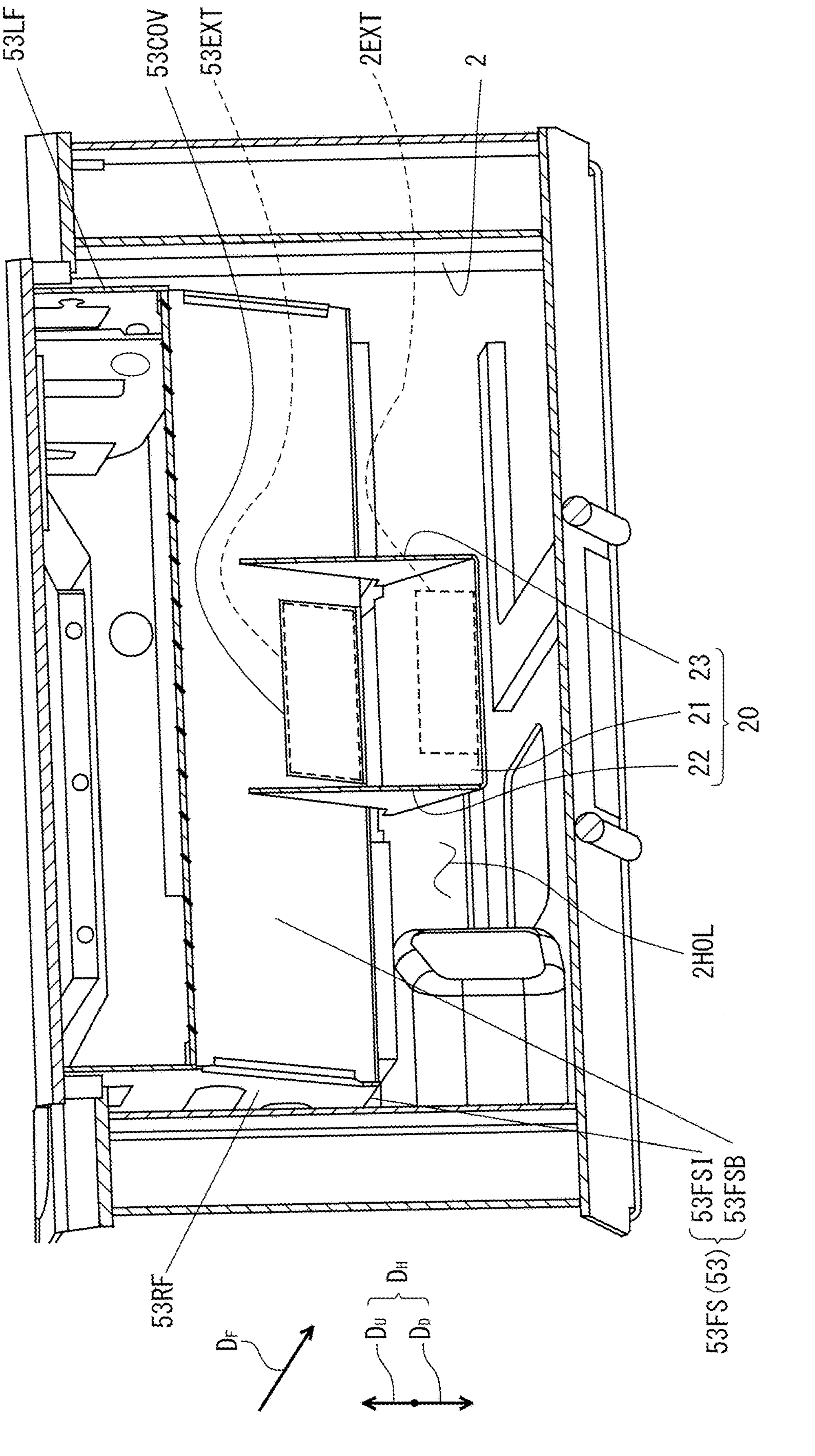
FIG. 12 is a perspective view of the vehicle body frame cut along a plane along a front base frame, as viewed from obliquely in front of the work vehicle.

FIG. 12 is a perspective view of the vehicle body frame 2 cut along a plane along the front base frame 2BF and viewed from the front of the work vehicle 1. FIG. 12 shows a closed state in which the floor frame 53FS is housed in the housing hole 2HOL of the vehicle body frame 2. Referring to FIG. 12, the cabin frame 53 has a first dust discharge port 53EXT configured to discharge dust in the cabin 5 at substantially the middle of the slant frame 53FSI in the lateral direction DLA perpendicular to the longitudinal direction DLT along the bottom floor surface FS1, where the seat support frame 53SS and the slant frame 53FSI face each other. The cabin frame 53 further includes a cover 53COV for covering the first dust discharge port 53EXT.

Referring to FIGS. 4 and 12, the vehicle body frame 2 further includes a second dust discharge port 2EXT and a discharge passage 20. The second dust discharge port 2EXT is configured to discharge dust. The second dust discharge port 2EXT is provided in the front base frame 2BF. The vehicle body frame 2 further includes a cover 2COV provided on the second dust discharge port 2EXT. The discharge passage 20 is positioned below the first dust discharge port 53EXT in the closed state, and is inclined toward the second dust discharge port 2EXT in the forward direction DF and the downward direction DD. More specifically, the discharge passage 20 is formed by an inclined frame 21, a first guard frame 22, and a second guard frame 23. The first guard frame 22 and the second guard frame 23 are formed by being bent from the inclined frame 21. Referring to FIGS. 6, 8, and 10, the slant mat portion 61 includes a lid cover portion 61*a* opposed to the first dust discharge port 53EXT and a frame cover portion 61*b* other than the lid cover portion 61*a*. With the above configuration, the frame cover portion 61*b* and the lid 53COV can be removed to discharge mud on the floor mat 60 to the discharge passage 20, and the lid 2COV can be opened to discharge mud accumulated in the discharge passage 20 to the outside of the work vehicle 1.

<Operation and Effects of Embodiment>

With the work vehicle 1 according to the present embodiments, in the cabin 5 in which the front lower end of the cabin frame 53 is cut obliquely like the slant frame 53FSI, by providing the slant mat portion 61 having a smaller inclination than the slant frame 53FSI to expand the area where the feet can be placed, it is possible to provide a work vehicle 1 having a footrest 30 where the feet can be placed such that the driver feel free from tightness.

In the above embodiment, the case where the slant frame 53FSI has a flat plate shape is described, but the slant frame 53FSI may be curved so as not to protrude from the arc ARC of FIG. 5. Even in this case, the second angle θ2 may be defined by the plane surface FS2 represented by the first straight line L1 and the second straight line LS2 and the bottom floor surface FS1.

In this application, the word "comprise" and its derivatives are used as open-ended terms to describe the presence of elements but not to exclude the presence of other elements not listed. This applies to "having", "including" and derivatives thereof.

The terms "member," "part," "element," "body," and "structure" may have a plurality of meanings, such as a single portion or a plurality of portions.

The ordinal numbers such as "first" and "second" are merely terms for identifying the configuration, and do not have other meanings (for example, a specific order). For example, the presence of a "first element" does not imply the presence of a "second element," and the presence of a "second element" does not imply the presence of a "first element."

Terms of degree such as "substantially", "about", and "approximately" can mean a reasonable amount of deviation such that the end result is not significantly changed, unless the embodiment is specifically described otherwise. All numerical values recited herein may be construed to include terms such as "substantially," "about," and "approximately."

The phrase "at least one of A and B" as used herein should be interpreted to include A alone, B alone, and both A and B.

Obviously, numerous modifications and variations of the present invention are possible in light of the above teachings. Thus, it is to be understood that the invention may be practiced otherwise than as specifically described herein without departing from the scope of the invention.

What is claimed is:

1. A work vehicle, comprising:
a cabin frame defining a cabin interior; and
a floor mat placed on the cabin frame;
the cabin frame comprising:
 a floor frame configured to support the floor mat;
 a front frame configured to support a front window; and
 a seat support frame configured to support a driver's seat opposite to the front frame with respect to the floor frame;
the floor frame comprising:
 a bottom frame connected to the seat support frame and having a flat shape that defines a bottom floor surface facing the cabin interior; and
 a slant frame connecting the front frame and the bottom frame, the slant frame being inclined closer to the front frame than the bottom frame, the slant frame being provided between a first straight line and a second straight line, the first straight line representing a boundary facing the cabin interior between the bottom frame and the slant frame, the second straight line representing a boundary facing the cabin interior between the slant frame and the front frame;
the floor mat comprising:
 a bottom mat portion provided on the bottom frame, the bottom mat portion having a first mat surface facing the cabin interior; and
 a slant mat portion provided to be supported by both the slant frame and the bottom frame and connected to the bottom mat portion such that the bottom mat portion is provided between the seat support frame and the slant mat portion, the slant mat portion having a second mat surface facing the cabin interior, a first angle formed by the first mat surface and the second mat surface being larger than a second angle formed by the bottom floor surface and a plane defined to include the first straight line and the second straight line.

2. The work vehicle according to claim 1, wherein the floor mat further comprises a first additional mat portion provided on the slant frame opposite to the bottom mat portion with respect to the slant mat portion.

3. The work vehicle according to claim 2, wherein the slant mat portion is integrally formed with the bottom mat portion.

4. The work vehicle according to claim 1,
the bottom mat portion comprising:
a first end representing a boundary between the bottom mat portion and the slant mat portion;
a second end facing the seat support frame opposite to the first end in a longitudinal direction in which the seat support frame is opposite to the slant frame;
a third end connecting the first end and the second end; and
a fourth end connecting the first end and the second end opposite to the third end in a lateral direction perpendicular to the longitudinal direction,
the slant mat portion comprising:
a fifth end facing the slant frame;
a sixth end facing the bottom frame opposite to the fifth end in the longitudinal direction;
a seventh end connecting the fifth end and the sixth end; and
an eighth end connecting the fifth end and the sixth end opposite to the seventh end in the lateral direction,
the floor mat further comprising:
a first rib connected to the third end and the seventh end and projecting from the first mat surface and the second mat surface in a projecting direction perpendicular to the longitudinal direction and the lateral direction and in which the second mat surface is inclined with respect to the first mat surface; and
a second rib which is connected to the fourth end and projects from the first mat surface in the projecting direction.

5. The work vehicle according to claim 4, wherein the slant mat portion, the bottom mat portion, the first rib, and the second rib are integrally formed.

6. The work vehicle according to claim 4, wherein the floor mat further comprises a third rib connected to the second end, the first rib, and the second rib and projecting from the first mat surface in the projecting direction.

7. The work vehicle according to claim 6, wherein the slant mat portion, the bottom mat portion, the first rib, the second rib, and the third rib are integrally formed.

8. The work vehicle according to claim 2,
the bottom mat portion comprising:
a first end representing a boundary between the bottom mat portion and the slant mat portion;
a second end facing the seat support frame opposite to the first end in a longitudinal direction in which the seat support frame is opposite to the front frame;
a third end connecting the first end and the second end; and
a fourth end connecting the first end and the second end opposite to the third end in a lateral direction perpendicular to the longitudinal direction,
the slant mat portion comprising:
a fifth end facing the slant frame;
a sixth end facing the bottom frame opposite to the fifth end in the longitudinal direction;
a seventh end connecting the fifth end and the sixth end; and
an eighth end connecting the fifth end and the sixth end opposite to the seventh end in the lateral direction,
the floor mat further comprising:
a first rib connected to the third end and the seventh end and projecting from the first mat surface and the second mat surface in a projecting direction perpendicular to the longitudinal direction and the lateral direction and in which the second mat surface is inclined with respect to the first mat surface; and
a second rib which is connected to the fourth end and projects from the first mat surface in the projecting direction.

9. The work vehicle according to claim 8, wherein the slant mat portion, the bottom mat portion, the first rib, and the second rib are integrally formed.

10. The work vehicle according to claim 8, wherein the floor mat further comprises the third rib connected to the second end, the first rib, and the second rib and projecting from the first mat surface in the projecting direction.

11. The work vehicle according to claim 10, wherein the slant mat portion, the bottom mat portion, the first rib, the second rib, and the third rib are integrally formed.

12. The work vehicle according to claim 6, wherein the third rib is provided to abut against the seat support frame.

13. The work vehicle according to claim 4,
wherein the cabin frame further comprises
a first side frame connecting the front frame, the floor frame, and the seat support frame and configured to abut against the first rib, and
a second side frame connecting the front frame, the floor frame, and the seat support frame and configured to abut against the second rib opposite to the lateral direction with respect to the first side frame.

14. The work vehicle according to claim 4, further comprising:
a brake arm provided on the floor frame; and
a brake pad supported by the brake arm,
wherein the floor mat comprises a brake arm cover provided on the bottom mat portion to cover the brake arm, the brake arm cover projecting in the projecting direction from the bottom mat portion,
wherein the slant mat portion is cut out at a brake installation portion that overlaps with the brake pad as viewed in a direction opposite to the projecting direction,
wherein the bottom mat portion has a cutout at a portion overlapping the brake arm cover in the direction opposite to the projecting direction, and
wherein the floor mat further includes a fourth rib provided beside the brake installation portion and connected to the eighth end, the fourth rib projecting from the second mat surface in the projecting direction.

15. The work vehicle according to claim 14, wherein the slant mat portion, the bottom mat portion, the first rib, the second rib, the third rib, and the fourth rib are integrally formed.

16. The work vehicle according to claim 1, further comprising:
a vehicle body frame configured to rotatably support the cabin frame and having a housing hole in which the floor frame is provided in a closed state; and
a pair of traveling devices arranged in a lateral direction and rotatably supported by the vehicle body frame, the pair of traveling devices being configured to drive the vehicle body frame forward and backward;
wherein the cabin frame includes a first dust discharge port through which dust in the cabin interior is discharged, the first dust discharge port being provided at substantially a middle of the slant frame in the lateral direction,
wherein the cabin frame further includes a lid to cover the first dust discharge port,
wherein the vehicle body frame comprises a second dust discharge port through which the dust is discharged, a discharge passage configured to communicate the first dust discharge port and the second dust discharge port, the discharge passage being provided below the first dust discharge port and inclined forward and downward toward the second dust discharge port in the closed state, and wherein the downward is a direction that is directed toward a ground from the vehicle frame and perpendicular to the forward, the backward, and the lateral direction.

17. The work vehicle according to claim 16, wherein the slant mat portion comprises a lid cover portion facing the first dust discharge port, and a frame cover portion that is other than the lid cover portion.

18. The work vehicle according to claim 1, further comprising:

a vehicle body frame configured to rotatably support the cabin frame about a rotational axis; and a pair of traveling devices rotatably supported by the vehicle body frame and configured to drive the vehicle body frame forward and backward, wherein the front frame includes an extension that extends forward of the vehicle body frame when the cabin frame is mounted on the vehicle body frame, wherein the slant frame is connected to the extension, wherein the vehicle body frame includes a front base frame which covers the front side of the slant frame when the cabin frame is mounted on the vehicle body frame, and wherein the second angle is defined so that the slant frame does not contact the front base frame when the slant frame rotates around the rotational axis.

19. The work vehicle according to claim 1, wherein the first angle is greater than 150 degrees, and wherein the second angle is smaller than 150 degrees.

20. The work vehicle according to claim 1, wherein a length of the bottom frame in a longitudinal direction in which the seat support frame is opposite to the slant frame and in which the first floor surface extends is greater than 131 cm.

* * * * *